United States Patent
Motes et al.

(10) Patent No.: US 10,848,556 B2
(45) Date of Patent: *Nov. 24, 2020

(54) SYSTEMS AND METHODS FOR ADDING DIGITAL CONTENT TO CONTENT MANAGEMENT SERVICE ACCOUNTS

(71) Applicant: DROPBOX, INC., San Francisco, CA (US)

(72) Inventors: Aston Motes, San Francisco, CA (US); Makinde Adeagbo, San Francisco, CA (US); Trevor Berg, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,242

(22) Filed: Jun. 6, 2019

(65) Prior Publication Data

US 2019/0289071 A1 Sep. 19, 2019

Related U.S. Application Data

(63) Continuation of application No. 15/050,793, filed on Feb. 23, 2016, now Pat. No. 10,348,823, which is a
(Continued)

(51) Int. Cl.
*G06F 21/10* (2013.01)
*H04L 29/08* (2006.01)
(Continued)

(52) U.S. Cl.
CPC .......... *H04L 67/1095* (2013.01); *H04L 29/06* (2013.01); *H04L 67/02* (2013.01);
(Continued)

(58) Field of Classification Search
CPC ... H04L 29/06; H04L 29/08072; H04L 63/10; H04L 63/0428; G06F 21/10
(Continued)

(56) References Cited

U.S. PATENT DOCUMENTS 6,684,212 B1 1/2004 Day et al.
6,687,741 B1 2/2004 Ramaley et al.
(Continued)

OTHER PUBLICATIONS

Search Report and Written Opinion dated Apr. 6, 2012 issued in International Application No. PCT/US2011/041531, 6 Pages.

*Primary Examiner* — Khanh Q Dinh
(74) *Attorney, Agent, or Firm* — Polsinellit PC

(57) ABSTRACT

Systems and methods for adding digital content associated with a first user account within a content management system to a second user account within the content management system. In various embodiments, the system may be configured to allow a user to add digital content to an account within a content management system associated with the user when the user receives a shared link to access digital content associated with an account within the content management system belonging to another user. The system may be configured to add the digital content to the user account by associating the digital content with the user's account. In various embodiments, the system may be configured to add the digital content to the user's account by creating an entry in a server-side file journal associated with the user's account, where the entry includes one or more file reference strings associated with the digital content.

20 Claims, 6 Drawing Sheets

Related U.S. Application Data continuation of application No. 14/455,417, filed on Aug. 8, 2014, now abandoned, which is a continuation of application No. 13/776,275, filed on Feb. 25, 2013, now Pat. No. 8,838,681.

(60) Provisional application No. 61/745,519, filed on Dec. 21, 2012.

(51) Int. Cl.
*H04L 29/06* (2006.01)
*H04L 12/26* (2006.01)

(52) U.S. Cl.
CPC ............ *H04L 67/06* (2013.01); *H04L 67/104* (2013.01); *H04L 67/306* (2013.01); *H04L 29/08072* (2013.01); *H04L 43/08* (2013.01); *H04L 63/10* (2013.01); *H04L 69/329* (2013.01)

(58) Field of Classification Search
USPC ................................ 709/220, 224, 226, 227
See application file for complete search history.

(56) References Cited

U.S. PATENT DOCUMENTS

| | | | |
|---|---|---|---|
| 6,988,138 | B1 | 1/2006 | Alcorn et al. |
| 7,177,426 | B1 | 2/2007 | Dube |
| 7,206,806 | B2 | 4/2007 | Pineau |
| 7,260,646 | B1 | 8/2007 | Stefanic et al. |
| 7,460,130 | B2 | 12/2008 | Salganicoff |
| 7,676,526 | B1 | 3/2010 | Beloussov et al. |
| 7,730,113 | B1 | 6/2010 | Payette et al. |
| 7,756,892 | B2 | 7/2010 | Levy |
| 7,822,793 | B2 | 10/2010 | Rawat et al. |
| 7,970,850 | B1 | 6/2011 | Callanan |
| 8,065,424 | B2 | 11/2011 | Foresti et al. |
| 8,140,506 | B2 | 3/2012 | Pennington |
| 8,194,940 | B1 | 6/2012 | Kiyohara et al. |
| 8,533,466 | B2 * | 9/2013 | Taylor ................. G06F 21/6209 713/165 |
| 8,561,205 | B2 | 10/2013 | McCurdy et al. |
| 8,584,259 | B2 | 11/2013 | Le Chevalier et al. |
| 8,645,687 | B2 * | 2/2014 | Taylor ..................... G06F 21/10 713/165 |
| 8,707,404 | B2 | 4/2014 | Sorotokin et al. |
| 8,732,853 | B1 | 5/2014 | Byrne et al. |
| 8,756,656 | B1 | 6/2014 | Hartmann |
| 8,805,966 | B2 | 8/2014 | Raciborski et al. |
| 8,824,751 | B2 | 9/2014 | Wise |
| 8,838,417 | B2 | 9/2014 | Rikkola et al. |
| 8,838,681 | B2 * | 9/2014 | Motes ..................... H04L 67/02 709/203 |
| 8,843,637 | B2 * | 9/2014 | Dietrich ................ H04L 67/104 709/226 |
| 8,917,631 | B2 | 12/2014 | Zivkovic |
| 8,949,607 | B2 | 2/2015 | Boesgaard Soerensen |
| 9,026,033 | B2 | 5/2015 | Khedouri et al. |
| 9,049,173 | B2 | 6/2015 | Ferdowsi |
| 9,075,954 | B2 | 6/2015 | Kirigin et al. |
| 9,177,116 | B2 * | 11/2015 | Elazar ................. H04L 63/0428 |
| 9,270,663 | B2 | 2/2016 | Kravitz et al. |
| 9,304,667 | B2 | 4/2016 | Petit, Jr. et al. |
| 9,319,400 | B2 | 4/2016 | Byrne et al. |
| 10,348,823 | B2 * | 7/2019 | Motes ..................... H04L 29/06 |
| 2001/0056463 | A1 | 12/2001 | Grady et al. |
| 2002/0073443 | A1 | 6/2002 | Heifetz et al. |
| 2003/0014477 | A1 | 1/2003 | Oppenheimer et al. |
| 2003/0097410 | A1 | 5/2003 | Atkins et al. |
| 2003/0120729 | A1 | 6/2003 | Kim et al. |
| 2003/0152904 | A1 | 8/2003 | Doty |
| 2003/0227487 | A1 | 12/2003 | Hugh |
| 2004/0025025 | A1 | 2/2004 | Venkatesan et al. |
| 2004/0044746 | A1 | 3/2004 | Matsusaka |
| 2005/0076030 | A1 | 4/2005 | Hada et al. |
| 2005/0091289 | A1 | 4/2005 | Shappell et al. |
| 2005/0226166 | A1 | 10/2005 | Agrawal et al. |
| 2005/0240428 | A1 | 10/2005 | Gabrick et al. |
| 2006/0031489 | A1 | 2/2006 | Marcjan |
| 2006/0061599 | A1 | 3/2006 | Yu et al. |
| 2006/0133407 | A1 | 6/2006 | Kuisma |
| 2006/0230030 | A1 | 10/2006 | Volpa et al. |
| 2007/0016613 | A1 | 1/2007 | Foresti et al. |
| 2007/0118514 | A1 | 5/2007 | Mariappan |
| 2007/0156434 | A1 | 7/2007 | Martin et al. |
| 2007/0174341 | A1 | 7/2007 | Saripalli et al. |
| 2007/0203917 | A1 | 8/2007 | Du et al. |
| 2007/0214169 | A1 | 9/2007 | Audet et al. |
| 2007/0236347 | A1 | 10/2007 | Rawat et al. |
| 2007/0239760 | A1 | 10/2007 | Simon |
| 2007/0260747 | A1 | 11/2007 | Samzelius et al. |
| 2007/0279379 | A1 | 12/2007 | Stafanik et al. |
| 2007/0289022 | A1 | 12/2007 | Wittkotter |
| 2008/0091725 | A1 | 4/2008 | Hwang et al. |
| 2008/0109910 | A1 | 5/2008 | Day et al. |
| 2008/0177994 | A1 | 7/2008 | Mayer |
| 2008/0216139 | A1 | 9/2008 | Liwerant et al. |
| 2008/0244038 | A1 | 10/2008 | Martinez |
| 2008/0244721 | A1 | 10/2008 | Barrus et al. |
| 2009/0216569 | A1 | 8/2009 | Bonev et al. |
| 2009/0287715 | A1 | 11/2009 | Chi et al. |
| 2009/0300723 | A1 | 12/2009 | Nemoy et al. |
| 2010/0011431 | A1 | 1/2010 | Cynkin et al. |
| 2010/0063961 | A1 | 3/2010 | Guiheneuf et al. |
| 2010/0185698 | A1 | 7/2010 | Lee et al. |
| 2010/0211998 | A1 | 8/2010 | Soelberg et al. |
| 2010/0274864 | A1 | 10/2010 | Jalili |
| 2011/0035503 | A1 | 2/2011 | Zaid et al. |
| 2011/0137986 | A1 | 6/2011 | Wolf |
| 2011/0154456 | A1 | 6/2011 | Machani |
| 2011/0167159 | A1 | 7/2011 | Bethlehem et al. |
| 2011/0264532 | A1 | 10/2011 | Chan et al. |
| 2011/0264768 | A1 | 10/2011 | Walker et al. |
| 2011/0276638 | A1 | 11/2011 | Errico et al. |
| 2011/0287748 | A1 | 11/2011 | Angel et al. |
| 2012/0127328 | A1 | 5/2012 | Winbush, III |
| 2012/0131005 | A1 | 5/2012 | Shen et al. |
| 2012/0151002 | A1 | 6/2012 | Lin |
| 2012/0197980 | A1 | 8/2012 | Terieski et al. |
| 2012/0209892 | A1 | 8/2012 | Macaskill et al. |
| 2012/0278404 | A1 | 11/2012 | Meisels et al. |
| 2012/0290686 | A1 | 11/2012 | Anchan |
| 2012/0303489 | A1 | 11/2012 | Robb et al. |
| 2012/0324121 | A1 | 12/2012 | Carr et al. |
| 2013/0013560 | A1 | 1/2013 | Goldberg et al. |
| 2013/0013561 | A1 | 1/2013 | Chan et al. |
| 2013/0018960 | A1 | 1/2013 | Knysz et al. |
| 2013/0091026 | A1 | 4/2013 | Deng et al. |
| 2013/0174272 | A1 | 7/2013 | Chevalier et al. |
| 2013/0332854 | A1 | 12/2013 | Roman |
| 2013/0332856 | A1 | 12/2013 | Sanders et al. |
| 2014/0067865 | A1 | 3/2014 | Kirigin |
| 2014/0067929 | A1 * | 3/2014 | Kirigin ................... H04L 67/06 709/204 |
| 2014/0181198 | A1 * | 6/2014 | Motes ..................... H04L 29/06 709/204 |
| 2014/0215568 | A1 | 7/2014 | Kirigin et al. |
| 2014/0289868 | A1 | 9/2014 | Byrne et al. |
| 2014/0351341 | A1 * | 11/2014 | Motes ..................... H04L 29/06 709/204 |
| 2016/0173596 | A1 * | 6/2016 | Motes ..................... H04L 29/06 709/206 |

* cited by examiner

SYSTEMS AND METHODS FOR ADDING DIGITAL CONTENT TO CONTENT MANAGEMENT SERVICE ACCOUNTS

CROSS REFERENCE TO RELATED APPLICATIONS

This application is a continuation of U.S. patent application Ser. No. 15/050,793, filed Feb. 23, 2016, now allowed, which is a continuation of U.S. patent application Ser. No. 14/455,417, filed Aug. 8, 2014, which is a continuation of U.S. patent application Ser. No. 13/776,275, filed Feb. 25, 2013, now U.S. Pat. No. 8,838,681, which claims the benefit of and priority to U.S. Provisional Patent Application No. 61/745,519, filed on Dec. 21, 2012; the contents of each of the above patent applications are hereby expressly incorporated by reference in their entirety for all purposes herein.

BACKGROUND

Users may desire to easily send and receive digital content to and from one another as well as to easily store digital content that they receive from other users. Sending and storing digital content, particularly large amounts of digital content containing a plurality of files, can be difficult and time-consuming. Accordingly, there is currently a need for improved systems and methods for sending, receiving, and storing digital content, particularly in the context of content management systems.

SUMMARY

A computer system according to various embodiments may include at least one processor and may be configured for receiving a first request, from a first user, to share digital content, such as digital files or folders, from the first user's account within a content management system with a second user having an account within the content management system. In response to receiving the request, the system may generate a link that may be activated by the second user to initiate receiving the digital content from the first user's account. If the second user activates the link, the system automatically associates the digital content with the second user's account within the content management system.

A computer-implemented method, according to various embodiments, includes a step of receiving a request to generate a digital content sharing link to digital content. In various embodiments, the digital content may be associated with a first account within a content management system. In response to receiving the request, the method may further include generating the digital content sharing link. In particular embodiments, the method may include receiving an indication that the digital content sharing link has been activated. In response to receiving the indication, the method may include the step of displaying a representation of the digital content along with a display element that may be activated to send a request to associate the digital content with a second account within the content management system. In particular embodiments, the method may further include the step of receiving an indication that the display element has been activated. The method may further include the step of enabling the association of the digital content with the second account in response to receiving the indication that the display element has been activated.

BRIEF DESCRIPTION OF THE DRAWINGS

Various embodiments of a computer system for adding digital content to user accounts in content management systems are described below. In the course of this description, reference will be made to the accompanying drawings, which are not necessarily drawn to scale, and wherein.

DETAILED DESCRIPTION OF VARIOUS EMBODIMENTS

Figure 1:
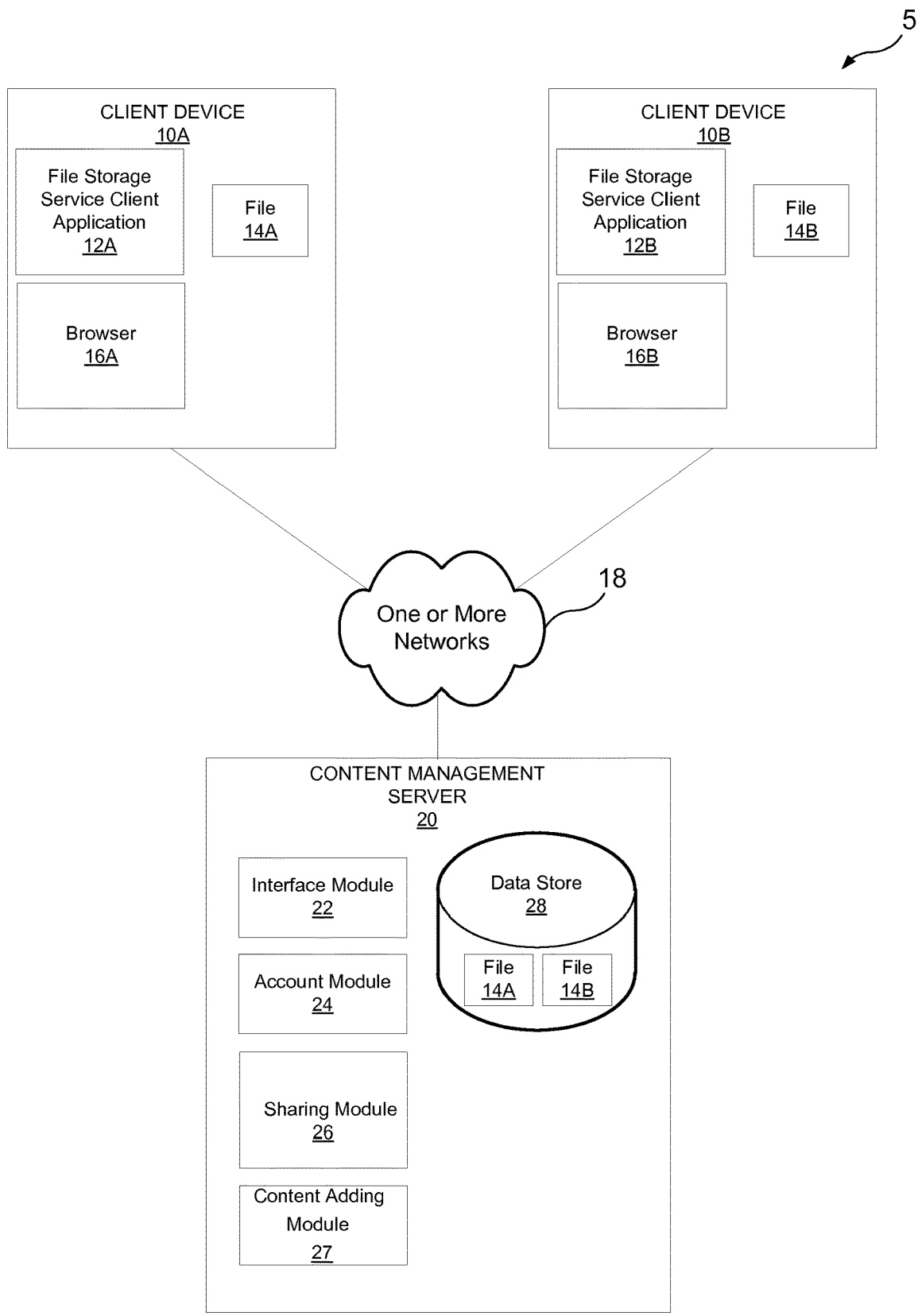
FIG. 1 shows a block diagram of a content management system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Computer systems and methods, according to various embodiments, may allow a user (e.g., a content sharer, or "sharer") to send a link (e.g., a URL) to another user (e.g., a content recipient, or "recipient") that the recipient may use to view a listing of digital content (e.g., such as one or more particular files, folders of files, or nested files) shared by the content sharer. In particular embodiments, this may be done within the context of an on-line content management system such as the Dropbox service of Dropbox, Inc. of San Francisco, Calif. by, for example, using a link sharing feature. An example of a suitable link sharing system is described in U.S. patent application Ser. No. 13/217,944, entitled "File Sharing Via Link Generation," which was filed on Aug. 25, 2011, and which is hereby incorporated by reference in its entirety.

In particular embodiments, a content sharer may send a link to a content recipient by, for example: (1) copying the link from a URL box in the content sharer's web browser; (2) pasting the link into an e-mail or text message; and (3) sending the e-mail or text message to the content recipient. Alternatively, the content sharer may share the link in any other manner, such as by posting the link to a web site, copying the link to a file, sending the link to a recipient via an electronic message generated by the content management system, or verbally conveying the link to the content recipient. The content recipient may then view a listing of the digital content (e.g., files or folders) in his or her web browser by, for example, selecting the link or by manually pasting or typing the link into their browser. The content recipient may then access the digital content by selecting the digital content from the listing (e.g., by "clicking" on the digital content).

In various embodiments, the content recipient may then add the digital content to an account associated with the content recipient on a content management system (e.g., a synched or non-synched content management system). In particular embodiments, the content management system is the same content management system from which the content sharer shared digital content. To add the digital content to their account, the content recipient may, for example, select a suitable indicium when viewing the listing of digital content. In particular embodiments, the system may be configured to add the digital content to the content recipient's account by creating an entry in a server-side file journal associated with the content recipient's account, where the entry includes one or more file reference strings associated with the digital content. In particular embodiments, the addition of the one or more file reference strings to the content recipient's server-side file journal may add the digital content to the content recipient's account without creating a new copy of the digital content on any server associated with the user's account or the content management system. Rather, the system may add the digital content to the content recipient's account by providing access to the digital content to the content recipient in the digital content's existing storage location (e.g., on one or more servers associated with the content management system, etc.).

Exemplary System Platform

An exemplary platform for implementing various embodiments will now be discussed. Referring to FIG. 1, a content management system 5 implementing digital content sharing and addition of digital content to user accounts through link sharing is shown having a plurality of client devices 10A and 10B (collectively 10) and content management server 20, which may all be interconnected by at least one network 18. Various aspects of client devices and content storage server systems are discussed below.

Client Devices

In various embodiments, each client device 10 may have a content storage service client application 12A and 12B (collectively 12) through which respective digital content (e.g., such as files 14A and 14B) of that client may be specified for storage in content management server 20. It is noted that, in some embodiments, synchronized copies of files 14A and 14B may be kept on both content management server 20 and each respective client device 10, and the synchronization of the copies may be coordinated by content management server 20. In some embodiments, client devices 10 may provide a file-browser type interface (not shown) for directly manipulating the digital content stored on content management server 20 without maintaining a local copy, such as on a mobile device such as a smartphone or tablet computer. Client devices 10 may also include web browser 16A and 16B (collectively 16) for retrieving and presenting web pages and other content from webservers. Examples of suitable web browsers that may be used by client devices 10 include FIREFOX™, GOOGLE CHROME™, INTERNET EXPLORER™, OPERA™, and SAFARI™. It should be understood by those skilled in the art that web browser 16 may optionally be used to access content management server 20 instead of using content storage service client application 12.

Still referring to FIG. 1, while only two client devices 10A and 10B are shown for purposes of clarity, it should be understood by those skilled in the art that many client devices may simultaneously connect through network 18 to content management server 20 at any given time. Examples of client devices 10 include, but are not limited to a desktop computer, or a mobile computing device (e.g., such as a laptop computer, a tablet-computing device, a personal digital assistant, or a smart phone such as an IPHONE™ or BLACKBERRY™, or a SYMBIAN™ or ANDROID™ based smart phone). Each client device 10 may store one or more pieces of digital content (e.g. files) on content management server 20, and the digital content may be stored in any format. When content management system client application 12 presents digital content to a user, the digital content may be arranged in folders and the folders themselves may be arranged in other folders, or in any other arbitrary arrangement supported by content management server 20, as determined by the user. However, one of skill in the art should understand in light of this disclosure that each user's content storage architecture may be considerably different from the next, and in some instances, the content storage architecture may be implemented to maximize storage and file retrieval efficiency.

Content Management Server

Content management server 20 stores digital content and manages access to that digital content using client devices 10. Content management server 20 and its components may be implemented using any appropriate hardware and software for performing digital content serving, storage and retrieval functions. For purposes of clarity and ease of description, FIG. 1 illustrates an exemplary content management server 20.

Interface Module

As shown in FIG. 1, in various embodiments, content management server 20 may include interface module 22, account module 24, link-based sharing module 26, content adding module 27, and data store 28. Interface module 22 may facilitate content access and content storage between content management server 20 and client devices 10. In doing so, interface module 22 may receive digital content from and send digital content to client devices 10 consistent with the user's preferences for sharing digital content and may act as a counterpart to a client-side digital content-explorer style user interface that allows a user to manipulate digital content directly stored on content management server 20. In some embodiments, software operating on client devices 10 may integrate network-stored digital content with the client's local file system to enable a user to manipulate network-stored digital content through the same user interface (UI) used to manipulate digital content on the local file system, e.g., via a file explorer, file finder or browser application.

As an alternative or supplement to the client-side file-explorer interface, interface module 22 may provide a web interface for client devices 10 to access (e.g. via browser 16) and allow a user to manipulate digital content stored on content management server 20. In this way, the user may be able to directly manipulate digital content stored on content management server 20.

Data Store

In various embodiments, data store 28 may store pieces of digital content (e.g., such as files) such as those uploaded using client devices 10. In the embodiment illustrated in FIG. 1, client 10A for a first user (e.g. link sharer) has stored files 14A, and client 10B for a second user (e.g. a link recipient) has stored files 14B, which may be stored in data store 28. Copies of stored files 14A and 14B may also be locally stored on respective client devices 10. Data store 28 may maintain, for each user, information identifying the user, information describing the user's file directory, etc. in a file journal that is maintained for each user. In some embodiments, the file journal may be maintained on content storage server system 20. This file journal may be updated periodically using information obtained directly from the content storage server system 20 and/or from information obtained from one or more client devices 10. In this way, the server-stored file journal on content storage server system 20 (hereinafter the "server-side file journal") may be updated when a file is changed at the server or on the local client. The content storage server system 20 may then communicate with one or more clients devices 10 to assure that any relevant changes are reflected locally. For example, if a particular user makes a change to a particular file on a first client device, the change may be reflected in the server-side file journal, and the server-side file journal may be used to propagate the changes so that they are reflected both on the content storage server system 20 and on all client devices associated with the user. Such techniques may be implemented within the context of a synchronized content management system such as the DROPBOX™ content management service provided by Dropbox, Inc. of San Francisco, Calif.

Account Module

Account module 24 may track digital content stored in data store 28 and entries in the server-side file journal for each piece of digital content. As users grant content access permissions to other users, account module 24 may update the server-side file journal associated with each user in data store 20. Account module 24 may also track client devices 10 that are associated with each user's account. For example, a user may want to share all their files between their desktop computer and mobile computing device (e.g., tablet computer, smart phone, etc.). To make such a sharing arrangement seamless to the user, the user's single account on content storage server system 20 may be associated with each of the user's respective client devices by creating a new file reference string for each respective device and storing the file reference string in the user-associated server-side file journal. In this way, system 5 may be able to determine which client device is requesting retrieval of the file. Additionally, in some embodiments where a copy of the digital content is stored on content storage server system 20 and locally on each client device, a separate client-side file journal may be maintained on each client device to allow synchronization between and among the various client devices and content storage server system 20. In some embodiments, an application running on client device 10 manages synchronization of the client-side file journal with the server-side file journal in order to maintain synchronized local stored files with the server stored files.

Digital Content Storage Configuration

Figure 2A:
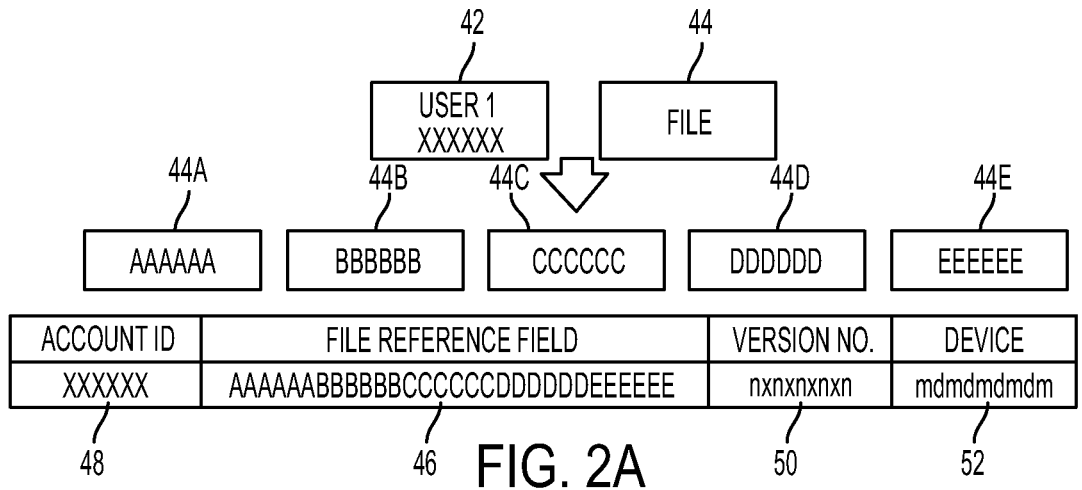
FIGS. 2A-2B show schematic representations of one embodiment of how files may be segmented and stored in the content management system of FIG. 1.

Referring to FIG. 2A, to expedite digital content handling and updating, in one embodiment, digital content (e.g., such as files or folder) stored in data store 28 may be segmented. That is, when user 42 uploads the digital content to data store 28, content storage server system 20 may be configured to segment the file into file segments 44A-44E and to assign a unique identifier to each file segment. In one embodiment, the file segments may be four (4) megabytes in size, but it should be understood by those skilled in the art in light of this disclosure that the size of the file segments can be of any suitable size. In one embodiment, first file segment 44A may be assigned a unique identifier AAAAAA, file segment 44B may be assigned identifier BBBBBB, and so forth. In one embodiment, the unique identifier may be a hash value calculated for each file segment using one or more hashing methods. In some embodiments, the file segments may be stored in memory for later retrieval of the file by a user. That is, the file may be stored as segments each having a unique identifier associated with the file that provides the identity and location of the file segment. To retrieve the file, the system may be adapted to use the respective unique identifiers for the various file segments to retrieve each file segment and then reconstruct the file for use by the user.

In various embodiments, content management server 20 may also be configured to create a unique file reference string 46 for each file by concatenating file segment identifiers 44A-44E. User identifier XXXXXX and file reference string 46 may be placed in a file journal entry 48. It should be understood that other information such as a version reference 50 and device reference 52 may also be included in file journal entry 48. In still other embodiments, information (metadata) related to the file and its content (e.g., image orientation, pixel resolution and file type if the file is an image) may also be included in the file journal entry to properly orient and process the file for ease of viewing. Those skilled in the art will understand from this disclosure that any information associated with a file might be included in file journal entry 48 to enhance the features of the present system. In yet other embodiments, file journal entry 48 may be entered into a single server-side file journal that is used for all users. In yet other embodiments, the system may assign each user their own server-side file journal so that only file journal entries for each file associated with that user are stored in their respective server-side file journal.

Figure 2B:
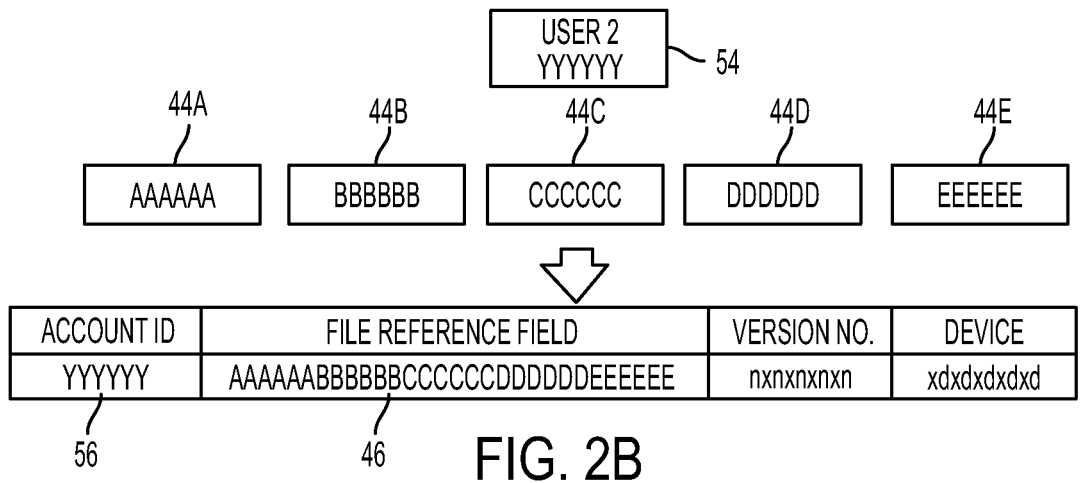

Referring to FIG. 2B, when file 44 is shared with another user 54 having a unique user ID YYYYYY, in one embodiment, file storage system 20 may be further configured to create another file journal entry 56 that associates file reference string 46 with the unique user identifier YYYYYY for user 54. Thus, when another user 54 is granted access to a file, it may be unnecessary to store additional copies of the file in data store 28. Instead, when the other user clicks the file link, file journal entry 48 may be used to reconstruct the file. That is, content storage server system 20 may break the concatenated file journal entry 48 into its constituent parts and uses the unique segment identifiers to retrieve the various file segments that constitute the file. Content storage server system 20 may reconstruct the file from the various file segments and display the file to the requesting user. It should be understood based on this disclosure to those skilled in the art that other efficient methods of file storage and user association may be used within the context of the present system and are within the scope of the disclosed system.

Content Storage Server System—Sharing Module

In various embodiments, a user wishing to share digital content (e.g., a link sharer) may select any, or any combination of, a single file, multiple files within a folder, an empty folder, multiple folders, or multiple files across multiple folders (individually and collectively a file set) to be shared with one or more other users. It should be understood that when multiple files across multiple folders are shared as a file set, that file set may define a virtual folder for those files.

Figure 3:
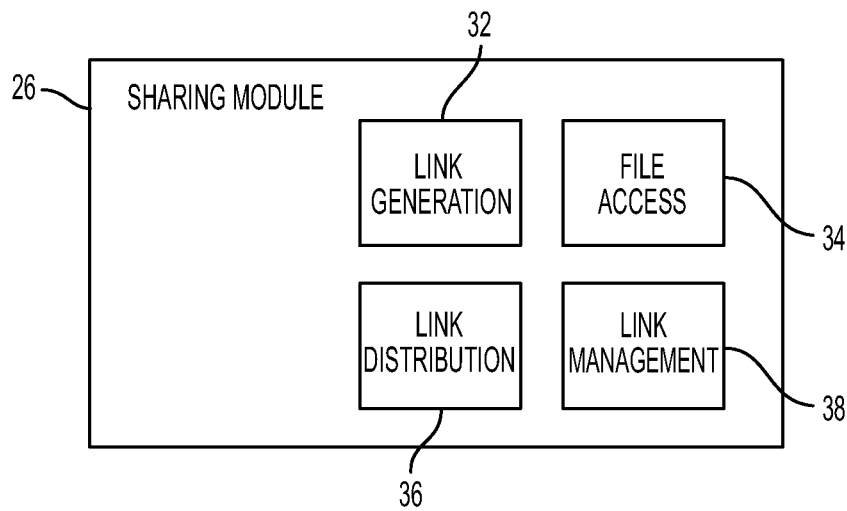
FIG. 3 shows a block diagram of a sharing module for use in the content management system of FIG. 1.

Referring to FIG. 3, a block diagram illustrating the components of a link-based sharing module 26 in accordance with embodiments of the present system is shown. Link-based sharing module 26 may enable a user to provide others access to the user's file sets through a shared link. Link-based sharing module 26 may include a link generation module 32 for generating links to the shared file sets, a file access module 34 for accessing the files via the generated links, a link distribution module 36 for facilitating distribution of links to other users, a link management module 38 for viewing generated links and database 40 that maintains information about linked file sets and related information such as corresponding sharing links.

Link generation module 32 may be configured to generate a link corresponding to the file set specified by the user. In one embodiment, upon receiving a request to share a particular file set, link generation module 32 may generate the unique file set descriptor of the shared file set and a unique file location path or URL that serves as the link. Sharing module 26 may save an association of the file set descriptor and the file location path or URL to data store 28. In some embodiments, the generated file sharing link may be independent of the file set descriptor so that the file set descriptor cannot be inferred from the file sharing link, and vice versa. An independent file set descriptor and file location path or URL may prevent malfeasance by making it essentially impossible to guess or reverse engineer a sharable link. As an example, when sharing a folder "Reunion" with a file ID of 3D8B99, link generation module 32 might generate a unique (e.g., one-way pad, or a pseudo-random value) URL https://www.service.com/s/2608u2mnco/BBQ.pdf, where the URL component 2608u2mnco may not be able to be reverse-engineered, and accordingly create an entry <3D8B99, https://www.service.com/s/2608u2mnco/BBQ.pdf> in data store 28. In one embodiment, the generated link may further be shortened. In some embodiments, the generated URL https://www.service.com/s/2608u2mnco/BBQ.pdf can further be shortened using a link-shortening service to a shorter URL (e.g., http://db.tt/xOFounw), and an additional association between the original link and the shortened link can be added to data store 28. In another embodiment, the file set can be directly associated with the shortened link rather than with an intermediate, longer generated link.

In still other embodiments, a user may generate multiple different links to the same file set. Thus, the user may more selectively control access to the file set by distributing different selections from among the multiple different links to different link-recipients or sets thereof. This may, for example, allow a user to revoke certain users' access to the file set while continuing to permit other users to access the file set (e.g., by deactivating certain users' links to the file set while maintaining other users' links in active status).

Moreover, since a file set link may be versatile, in some embodiments, the system may include reference to a particular relevant application, or applications, in a link by embedding an application identifier in the generated link. As an example, the generated link for a given file set could be the URL https://www.service.com?app=1ps3q/s/2608u2mnco/BBQ.pdf, which specifies (via the portion "app=1ps3q") that some application uniquely associated with the identifier "ips3q" (e.g., Microsoft Word or Microsoft Visio) should be used to view the file set. Alternatively, the association between the link and the application or application plug-in may be made as an entry in the data store 28 itself, rather than by including an application identifier in the link. For example, in various embodiments, a user may generate a first link to a file set that specifies use of a first application for viewing the file set, and a second link that specifies use of a second application for viewing the file set. In this example, the data store 28 may in turn contain two corresponding entries: i.e., <file set identifier, first link identifier, first application identifier> and <file set identifier, second link identifier, second application identifier>. In another embodiment, link-based sharing module 26 may be configured to select the proper applications or application plug-ins to use in the file browser, e.g., based on the types of files in the file set. The link-based sharing module 26 may also allow users to specify which application should open a particular file or set of files when the files are accessed via a particular link.

Exemplary System Operation—Digital Content Adding Module

Figure 4:
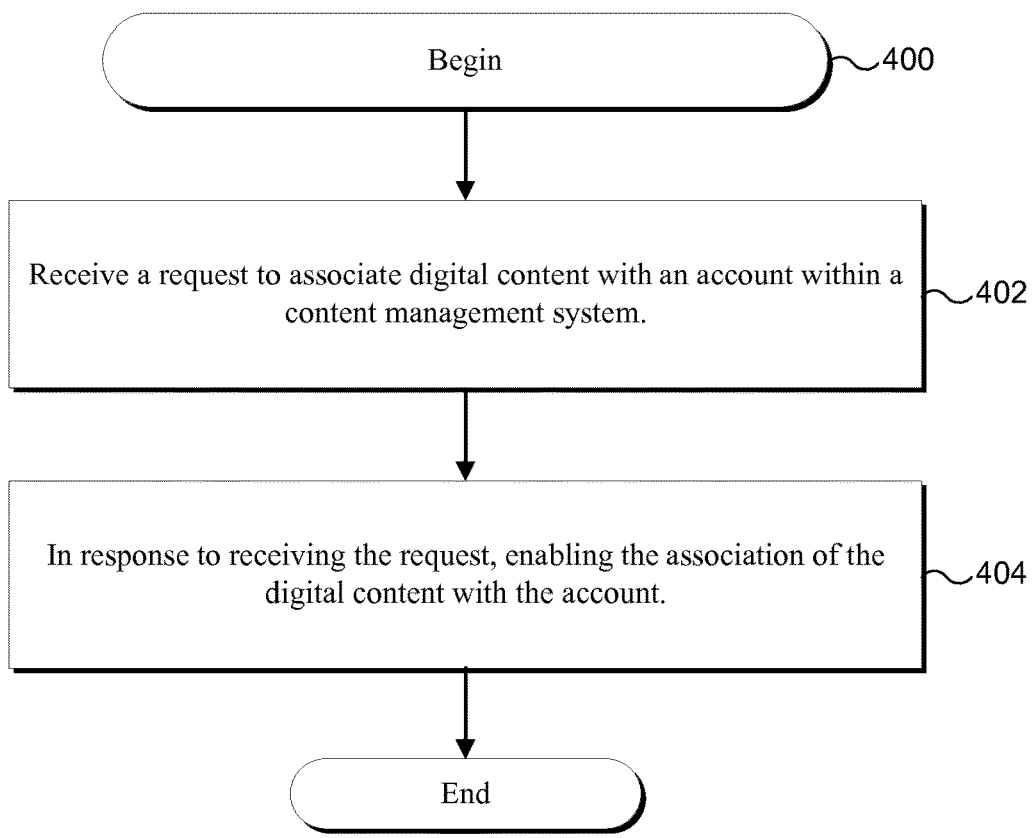
FIG. 4 shows a flow chart that generally illustrates various steps executed by a digital content adding module that, for example, may be executed by the system.

FIG. 4 shows exemplary method steps which may be performed by the present system. It should be understood by reference to this disclosure that these methods describe exemplary embodiments of the method steps carried out by the present system, and that other exemplary embodiments may be created by adding other steps, by removing one or more of the method steps shown in FIG. 4, or by performing the method steps in an alternate order.

FIG. 4 shows processing functions that may be performed by a content adding module, in accordance with various embodiments, and that may add digital content sent via link sharing (e.g., such as via any of the link sharing techniques described above) to an account associated with a particular user within a content management system. Beginning at Step 402, the system receives a request to associate digital content with an account within a content management system. In various embodiments, the system may receive the request from a user of a client device, for example, when the user activates (e.g., clicks on) a display element or other suitable indicium associated with the digital content. In some embodiments, the account may be associated with the user. In particular embodiments, the system may receive the request from a user with whom another user has shared the digital content through any of the link-sharing techniques described above. In various embodiments, the digital content may be associated with an account within the content management system associated with a user other than the requesting user (e.g., a second user such as the user that shared the digital content). In particular embodiments, the digital content may be stored on one or more servers associated with the content management system. In various embodiments, each piece of digital content may be associated with one or more file reference strings such as the file reference strings described above.

The system continues, at Step 404, by, in response to receiving the request, enabling the association of the digital content with the account (e.g., by adding the digital content to the account). In various embodiments, the system may be configured to add the digital content to the account by associating the digital content with the account of the user from whom the system received the request at Step 402. In particular embodiments, the system may be configured to add the digital content to the user's account by adding the one or more file reference strings associated with the digital content to a server-side file journal associated with the user (e.g., associated with the user's account). In various embodiments, the system may be configured to receive account information (e.g., account information associated with the account associated with the user) and use the account information to enable the association of the digital content with the account.

The system may, once the digital content has been added to a user's account, be configured to provide access to the digital content to that user through the user's account within the content management system (e.g., the user may be able to access the digital content through their user account rather than through the shared link from which the user originally received access to the file). In various embodiments, the system may be configured to add the digital content to the user's account without downloading, uploading, copying, or otherwise reproducing the digital content. The system may, in such embodiments, associate the digital content with the user's account based on the digital content's current storage location (e.g., on one or more servers associated with the content management system).

Exemplary User Experience

Figure 5:
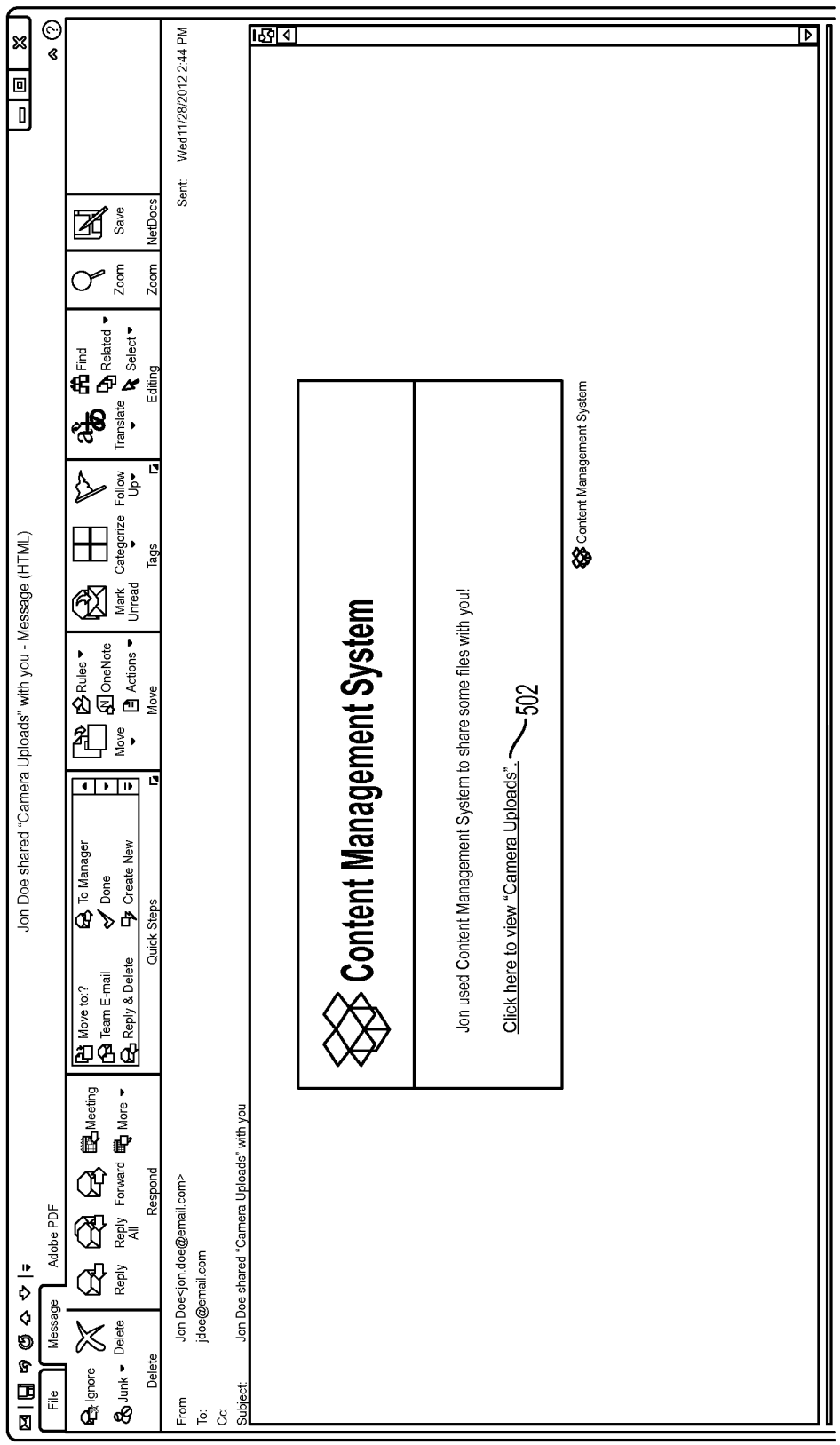
FIGS. 5-6 show screen shots of an exemplary digital content addition system.
Figure 6:
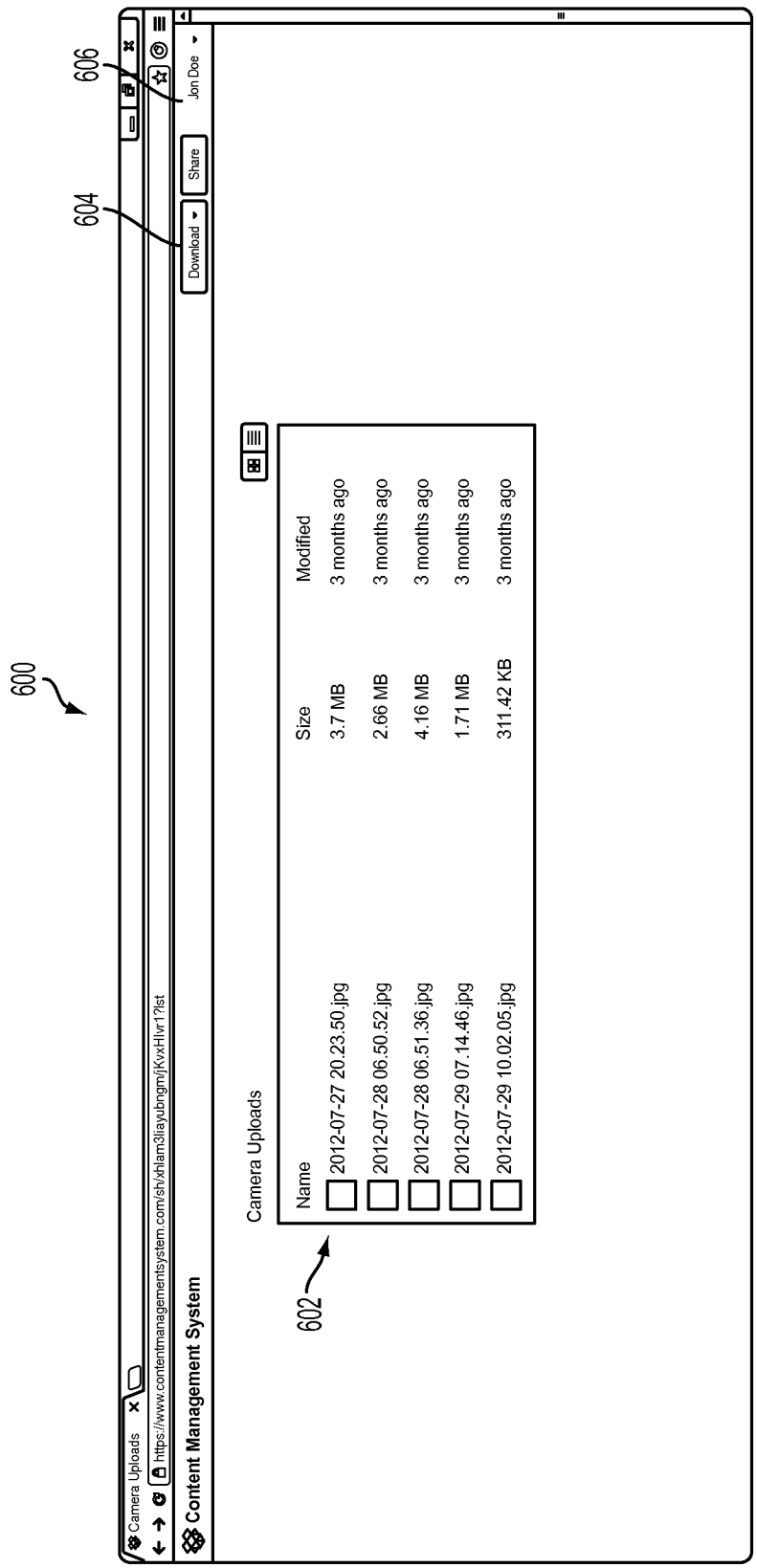
Figure 7:
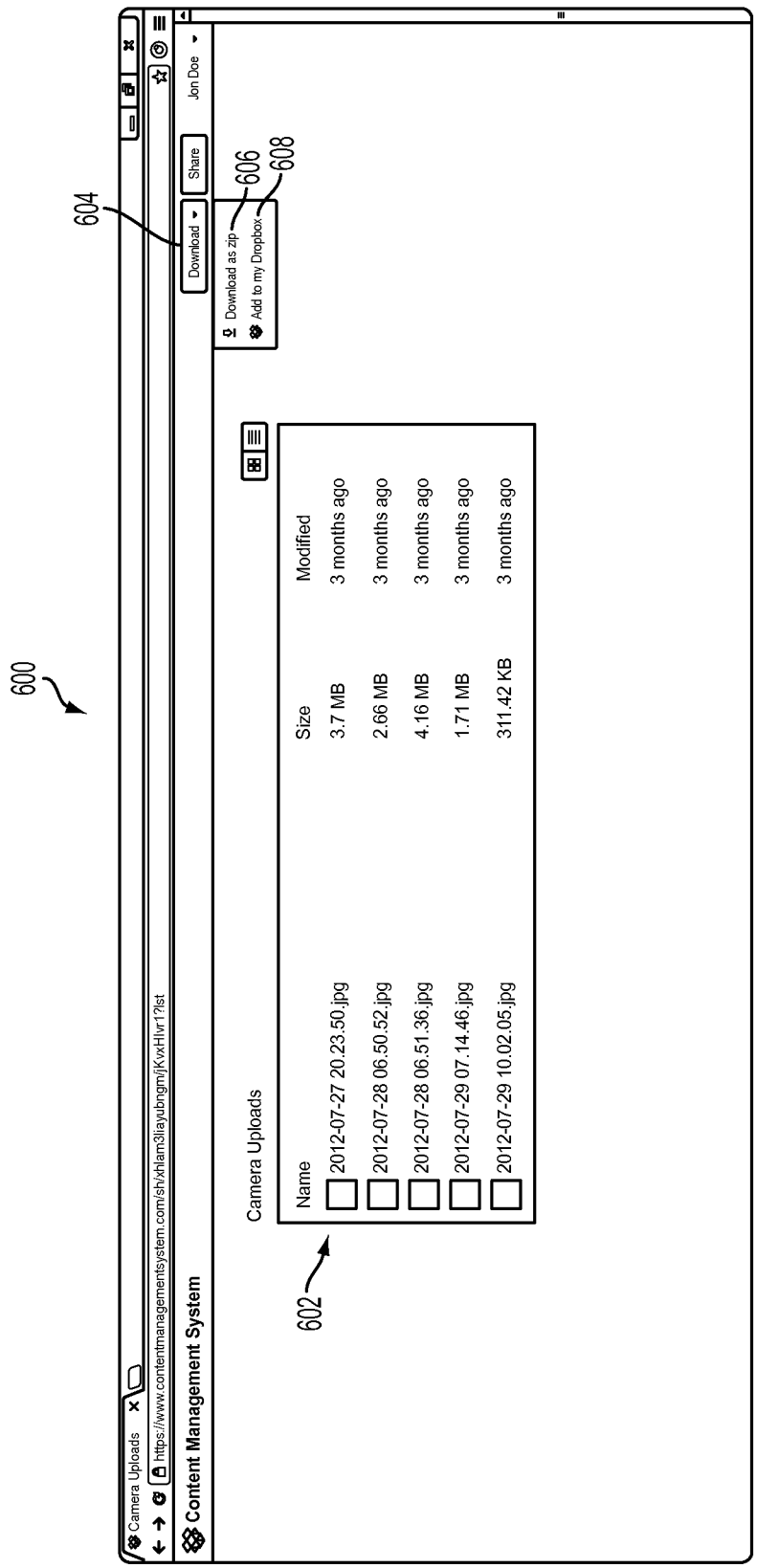
FIG. 7 shows a screen shot of an exemplary digital content addition system.

FIGS. 5-7 show exemplary screen displays and user interfaces that a user may experience when accessing a system for adding files to the user's account within a synced content management system. FIG. 5 shows e-mail message 500 that a user may have received from another user of the synced content management system that contains link 502 to one or more files that the other user has shared with the user. As shown in this figure, the other user has shared some files entitled "Camera Uploads". In order to access "Camera Uploads", the user may activate (e.g., click on) link 502.

After activating link 502, the system may display a screen display such as the screen display shown in FIG. 6. FIG. 6 shows web browser 600 that contains listing of files 602 that were sent to the user in the e-mail message 500 shown in FIG. 5. As may be understood from FIG. 6, the listing of files, in this example, contains the files in a folder entitled "Camera Uploads" that the other user has shared with the user. In this case, listing of files 602 includes a plurality of image files (e.g., jpeg files). As shown in this figure, the user may be currently signed into the user's account within the synced content management system as indicated by user's account name (e.g., Jon Doe) 606 on the website.

If the user wishes to add the files 602 in this "Camera Uploads" folder to the user's account, the user may select (e.g., click on) "Download" display element 604. FIG. 7 shows web browser 600 of FIG. 6 after the user has activated "Download" display element 604. As shown in this figure, the system, in response to the user's selection of "Download" display element 604 may display a drop down menu that includes options to download the file locally 606 (e.g., as a zip file containing the shared files) as well as "Add to my Dropbox" display element 608. The user may select (e.g., click on) "Add to my Dropbox" display element 608 in order to add files 602 in the "Camera Uploads" folder to the user's account within the synched content management system.

In various embodiments, the system may prompt the user to login to the user's account in response to the user selecting "Add to my Dropbox" display element 608. In particular embodiments, the system may then be configured to add the files to the user's account by adding suitable file reference strings associated with files 602 to a server-side file journal associated with the user's account within the synced content management system. In such embodiments, as discussed above, the system may provide access to files 602 to the user through the user's synced content management system account without having to download or otherwise copy or save files 602. Rather, the system may provide access to the user through the user's account by retrieving files 602 based on the files' file reference strings from their existing storage location (e.g. or locations) on one or more servers associated with the synced content management system.

CONCLUSION

Having the benefit of the teachings presented in the foregoing descriptions and associated drawings, one of skill in the art will recognize many modifications and other embodiments of the invention. For example, although various embodiments are described above are discussed as being implemented within the context of a synched, cloud-based content management system, it should be understood that some or all of the techniques described above may be employed within the context of other systems, such as non-synched cloud-based content management systems and other file sharing systems. In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. An online content management system comprising:
   at least one processor;
   a computer-readable medium storing instructions executable by the at least one processor, the instructions effective to:
   receive a request to share a digital content item from a first account of a content management system, wherein the digital content item is in the first account at the content management system;
   generate a link in response to the request, the generated link being effective to grant access to the digital content item to a second account, wherein granting access to the digital content item includes adding the digital content item to the second account within the content management system;
   receive a request from the first account to revoke the granted access to the digital content item by the second account; and
   revoking the granted access to the digital content item by the second account.

2. The online content management system of claim 1, the instructions further effective to:
   receive an indication that the generated link has been activated by the second account of the content management system;
   determine a first association between the generated link and the digital content item; and
   update the second account to include a second association between the digital content item and the second account, whereby the second association makes the digital content item accessible by the second account.

3. The online content management system of claim 1, the instructions further effective to:
   generate a second link in response to a second request, the generated link being effective to grant access to the digital content item to at least a third account; and
   maintaining access to the digital content item for the at least a third account after revoking the granted access to the digital content item by the second account.

4. The online content management system of claim 2, wherein the instructions are effective to present a graphical user interface displaying the digital content item within the second account.

5. The online content management system of claim 2, wherein revoking the granted access removes the digital content item from the second account within the content management system.

6. The online content management system of claim 1, wherein the generated link includes a reference to a relevant application associated with the generated link.

7. The online content management system of claim 1, wherein the granted access to the digital content item by the second account is revoked by adding a file reference string associated with the digital content item to a server-side file journal associated with the second account.

8. A computer-implemented method comprising:
receiving a request to share a digital content item from a first account of a content management system, wherein the digital content item is in the first account at the content management system;
generating a link in response to the request, the generated link being effective to grant access to the digital content item to a second account, wherein granting access to the digital content item includes adding the digital content item to the second account within the content management system;
receiving a request from the first account to revoke the granted access to the digital content item by the second account; and
revoking the granted access to the digital content item by the second account.

9. The method of claim 8, further comprising:
receiving an indication that the generated link has been activated by the second account of the content management system;
determining a first association between the generated link and the digital content item; and
updating the second account to include a second association between the digital content item and the second account, whereby the second association makes the digital content item accessible by the second account.

10. The method of claim 8, further comprising:
generating a second link in response to a second request, the generated link being effective to grant access of the digital content item to at least a third account; and
maintaining access to the digital content item for the at least a third account after revoking the granted access to the digital content item by the second account.

11. The method of claim 9, further comprising:
presenting a graphical user interface displaying the digital content item within the second account.

12. The method of claim 9, wherein revoking the granted access removes the digital content item from the second account within the content management system.

13. The method of claim 9, wherein the generated link includes a reference to a relevant application associated with the generated link.

14. The method of claim 8, wherein the granted access to the digital content item of the second account is revoked by adding a file reference string associated with the digital content item to a server-side file journal associated with the second account.

15. A non-transitory computer-readable medium comprising instructions stored on the non-transitory computer readable medium, the instructions effective, when executed to cause a computing device to:
receive a request to share a digital content item from a first account of a content management system, wherein the digital content item is in the first account at the content management system;
generate a link in response to the request, the generated link being effective to grant access to the digital content item to a second account, wherein granting access to the digital content item includes adding the digital content item to the second account within the content management system;
receive a request from the first account to revoke the granted access to the digital content item by the second account; and
revoking the granted access to the digital content item by the second account.

16. The non-transitory computer-readable medium of claim 15, the instructions further effective to:
receive an indication that the generated link has been activated by the second account of the content management system;
determine a first association between the generated link and the digital content item; and
update the second account to include a second association between the digital content item and the second account, whereby the second association makes the digital content item accessible by the second account.

17. The non-transitory computer-readable medium of claim 15, the instructions further effective to:
generate a second link in response to a second request, the generated link being effective to grant access to the digital content item to at least a third account; and
maintaining access to the digital content item for the at least a third account after revoking the granted access to the digital content item by the second account.

18. The non-transitory computer-readable medium of claim 16, wherein the instructions are effective to present a graphical user interface displaying the digital content item within the second account.

19. The non-transitory computer-readable medium of claim 16, wherein revoking the granted access removes the digital content item from the second account within the content management system.

20. The non-transitory computer-readable medium of claim 15, wherein the granted access to the digital content item of the second account is revoked by adding a file reference string associated with the digital content item to a server-side file journal associated with the second account.

* * * * *